Nov. 5, 1968    R. ANTRAIGUE    3,409,066
SCRAPING DEVICE FOR PNEUMATIC-TIRE CARCASSES
Filed Sept. 21, 1965

INVENTOR.
ROGER ANTRAIGUE

3,409,066
SCRAPING DEVICE FOR PNEUMATIC-TIRE CARCASSES
Roger Antraigue, 202 Quai de Jemmapes, Paris 10°, France
Filed Sept. 21, 1965, Ser. No. 488,861
3 Claims. (Cl. 157—13)

ABSTRACT OF THE DISCLOSURE

Scraping device for the tread surfaces of tire carcasses wherein a scraping disc is rotatably mounted on a swingable arm to sweep across that tread surface, the rotation of this disc being reversed upon each passage through a central plane so that traction due to the scraping action is always exerted outwardly as seen from that plane.

---

My present invention relates to an improved method for scraping the carcasses of pneumatic tires.

As is known, the scraping of carcasses, prior to the retreading of pneumatic tires, consists in reducing the carcass, on the portion thereof adapted to receive the strip of raw rubber, to a given external profile. This operation is carried out by removing material by means of a scraping tool, which in most cases is a disk-shaped rotary tool.

It has been established that for certain types of tires, and more particularly tires of the so-called radial or belt-type carcasses, the scraping operation, if carried out according to the usual practice, will sometimes result in internal damages which may seriously impair the qualities of the tire.

The invention is based on the fact that, for such carcasses, formed interiorily with reinforcing layers extending close to the lateral ridges of the tread, it is necessary that the scraping action should always tend to subject these layers to tensile stress.

It is an object of the invention to provide a transverse-scraping process, i.e. a process wherein the rotary scraper is moving along transversely to the median plane of the carcass, wherein, at any instant during the scraping action, the direction of rotation of the scraping tool is such that the reinforcing layers experience tensile stress due to the operation of the scraper.

It is another object of the invention to provide a device for carrying into effect this process, as well as a scraping machine comprising such a device.

Figure 2:
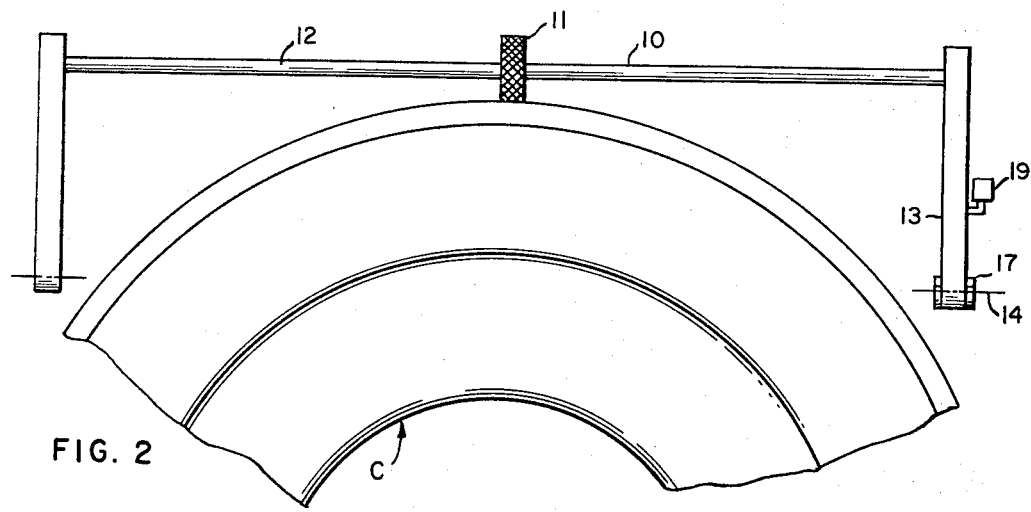
Figure 1:
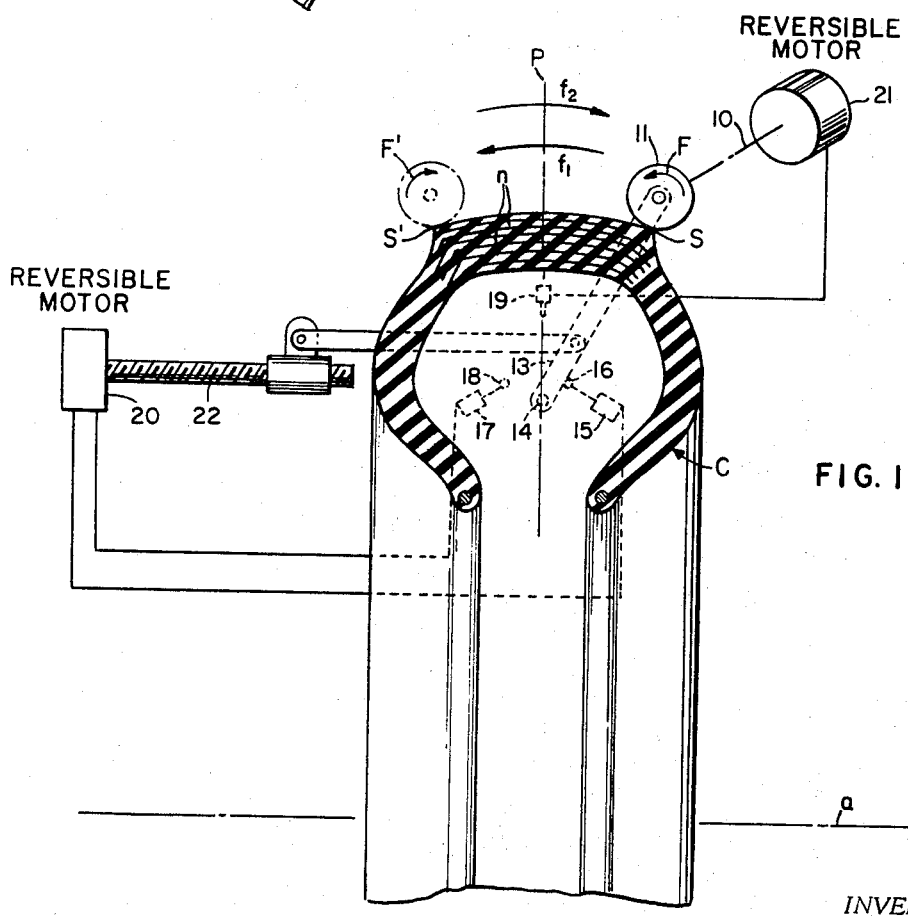

The invention will be best understood from the following description, given by way of example, and the appended drawing wherein:

FIG. 1 illustrates, somewhat diagrammatically, a scraping device according to the invention; and FIG. 2 is a side-elevational view of the assembly shown in FIG. 1.

The scraping tool 10 comprises a disk 11 mounted for rotation about an axis 12, at the end of an arm 13, pivotally supported at its other end, for swinging motion about an axis 14 lying in the median longitudinal plane P of the carcass and skew to a preferably horizontal axis $a$ about which said carcass is caused to rotate during the treatment. Means are provided to cause arm 13 to swing about axis 14 in a reciprocating movement, i.e. first in the direction of arrow $f_1$, then in the direction of arrow $f_2$, and so on. To this end, a first stop member 15 is provided, having a contact 16 co-operating with arm 13 in such a manner that the driving device of the latter, indicated diagrammatically as a reversible electric motor 20 operating a lead screw 22, causes the same to switch from clockwise rotation (i.e. in the direction of arrow $f_2$) to counterclockwise rotation (i.e. in the direction of arrow $f_1$). Similarly, a second stop member 17, carrying a contact 18, ensures the switching of the swinging movement from the counterclockwise direction to the clockwise direction.

Driving means shown as a reversible motor 21 are provided for causing the scraping disk 11 to rotate about the axis 12, this motor being adapted to rotate the scraper in one or the other direction. In addition, a contact 19 is provided substantially in the median longitudinal plane P of the carcass with which co-operates the arm 13, or an axialiary member thereof, to ensure, upon each engagement, the reversal of the direction of rotation of scraper 11.

The operation of the device is as follows:

In the position of arm 13 shown in solid lines, disk 10 rotates in the direction of arrows F, i.e. counterclockwise, as illustrated. With this direction of rotation, the reinforcing layers $n$ provided inside the carcass C, extending to the vicinity of ridges $s$, $s'$ of the tread surface or crown, are being subjected to a tensile stress. The scraping action is then carried out without affecting these layers.

When, during the rotation movement of arm 13 in the direction of arrow $f_1$, said arm reaches a central position substantially in the plane P, the co-operation of said arm with contact 19 causes the rotation of the disk-shaped scraper 11 to be reversed. Upon arm 13 reaching the position shown in dot-dash lines, which corresponds to the treatment of the portion of the carcass adjacent ridge $s'$, the disk 11 will thus rotate in the sense of arrow F', i.e. clockwise, whereby the reinforcing layers $n$ are again subjected to a laterally outward tensile stress which prevents them from damage.

When arm 13 co-operates with contact 18, its swing is reversed and occurs in the direction shown by arrow $f_2$; the scraping operation continues, with the disk 11 rotating in the direction of arrow F', until arm 13 assumes again its central position, substantially in the plane P; the switching action which then takes place, by co-operation of said arm with contact 19, reverses again the direction of rotation of disk 11, so that when arm 13 reverts to its position shown in solid lines, the direction of rotation of disk 11 is again that illustrated by arrow F.

What I claim is:

1. In a device for scraping tire carcasses, having means for rotatably supporting a carcass for rotation about its own axis, the combination therewith of a rotary scraping tool; a reciprocable support for said tool swingable between two limiting positions; first drive means for reciprocating said support to move said tool back and forth across the tread surface of a carcass to be scraped; reversible second drive means for rotating said tool; and switch means engageable by said support in a median position thereof for reversing the operation of said second drive means and the rotation of said tool midway through each sweep of the latter in a manner maintaining the scraping action of said tool outwardly directed on each side of a central plane of symmetry of the carcass transverse to said axis.

2. The combination defined in claim 1 wherein said first drive means include reversing contacts engageable by said support in said limiting positions thereof.

3. The combination defined in claim 2 wherein said support is a swingable arm having a fulcrum in said plane of symmetry.

References Cited

UNITED STATES PATENTS

| 2,788,851 | 4/1957 | Rawls et al. | 157—13 |
| 2,985,231 | 5/1961 | Roesch | 157—13 |
| 3,162,233 | 12/1964 | Stull | 157—13 |

TRAVIS S. McGEHEE, *Primary Examiner.*